United States Patent
Wang et al.

(10) Patent No.: US 8,085,001 B2
(45) Date of Patent: *Dec. 27, 2011

(54) BATTERY CHARGING CONTROL CIRCUIT

(75) Inventors: Han-Che Wang, Taipei Hsien (TW);
Shin-Hong Chung, Taipei Hsien (TW);
Xin Zhao, Shenzhen (CN); Hong-Sheng Ouyang, Shenzhen (CN); Ruey-Shyang You, Taipei Hsien (TW); Kuan-Hong Hsieh, Taipei Hsien (TW)

(73) Assignees: Hong Fu Jin Precision Industry (ShenZhen) Co., Ltd., Shenzhen, Guangdong Province (CN); Hon Hai Precision Industry Co., Ltd., Tu-Cheng, New Taipei (TW)

( * ) Notice: Subject to any disclaimer, the term of this patent is extended or adjusted under 35 U.S.C. 154(b) by 455 days.

This patent is subject to a terminal disclaimer.

(21) Appl. No.: 12/411,354

(22) Filed: Mar. 25, 2009

(65) Prior Publication Data
US 2009/0256530 A1    Oct. 15, 2009

(30) Foreign Application Priority Data
Apr. 9, 2008  (CN) .......................... 2008 1 0066294

(51) Int. Cl.
*H02J 7/06*    (2006.01)
*H02J 7/24*    (2006.01)
*H02J 7/04*    (2006.01)
*H02J 7/16*    (2006.01)

(52) U.S. Cl. .......................... 320/164; 320/162; 320/139
(58) Field of Classification Search .................. 320/164
See application file for complete search history.

(56) References Cited

U.S. PATENT DOCUMENTS

| | | | |
|---|---|---|---|
| 5,880,576 A * | 3/1999 | Nagai | 320/138 |
| 2004/0164708 A1 * | 8/2004 | Veselic et al. | 320/132 |
| 2008/0197811 A1 * | 8/2008 | Hartular et al. | 320/141 |
| 2009/0058369 A1 * | 3/2009 | Wang et al. | 320/149 |
| 2009/0309547 A1 * | 12/2009 | Nakatsuji | 320/134 |
| 2010/0188051 A1 * | 7/2010 | Yamazaki et al. | 320/148 |
| 2011/0025277 A1 * | 2/2011 | Hussain et al. | 320/163 |

* cited by examiner

*Primary Examiner* — Patrick Assouad
*Assistant Examiner* — Nathaniel Pelton
(74) *Attorney, Agent, or Firm* — Altis Law Group, Inc.

(57) ABSTRACT

The present invention provides a charging control circuit for a rechargeable battery. The charging control circuit includes: a constant-current charging unit and a trickle charging unit. The charging control circuit further includes a branch switch, a detection switch, a control unit, and a detection unit. The branch switch is connected between a power source and the rechargeable battery for enabling or disabling the constant-current charging unit, the detection switch is turned on or off depending on the enable or disable state of the constant-current charging unit. The control unit is connected between the detection switch and the branch switch for controlling the branch switch to turn on or off depending on the off or on state of the detection switch.

8 Claims, 2 Drawing Sheets

BATTERY CHARGING CONTROL CIRCUIT

BACKGROUND

1. Related Applications

This application is related to a co-pending U.S. patent application Ser. No. 12/408,727 filed concurrently herewith and entitled "BATTERY CHARGING CONTROL CIRCUIT", which is incorporated herein in its entirety by reference.

2. Technical Field

The present disclosure relates to battery circuits and, particularly, to a battery charging circuit.

3. General Background

Generally, battery chargers either use a constant current (CC) mode or a constant voltage (CV) mode to charge a battery. However, in either the CC mode or the CV mode, battery charging is terminated once the battery's voltage reaches a peak value (e.g., 4.2 V), which may result in the battery not being fully charged.

Therefore, it is necessary to provide an apparatus and method to overcome the above-identified deficiencies.

BRIEF DESCRIPTION OF THE DRAWINGS

The components in the drawings are not necessarily drawn to measuring scale, the emphasis instead being placed upon clearly illustrating the principles of the battery charging control circuit. Moreover, in the drawings, like reference numerals designate corresponding parts throughout the several views.

DETAILED DESCRIPTION OF THE EMBODIMENTS

Figure 1:
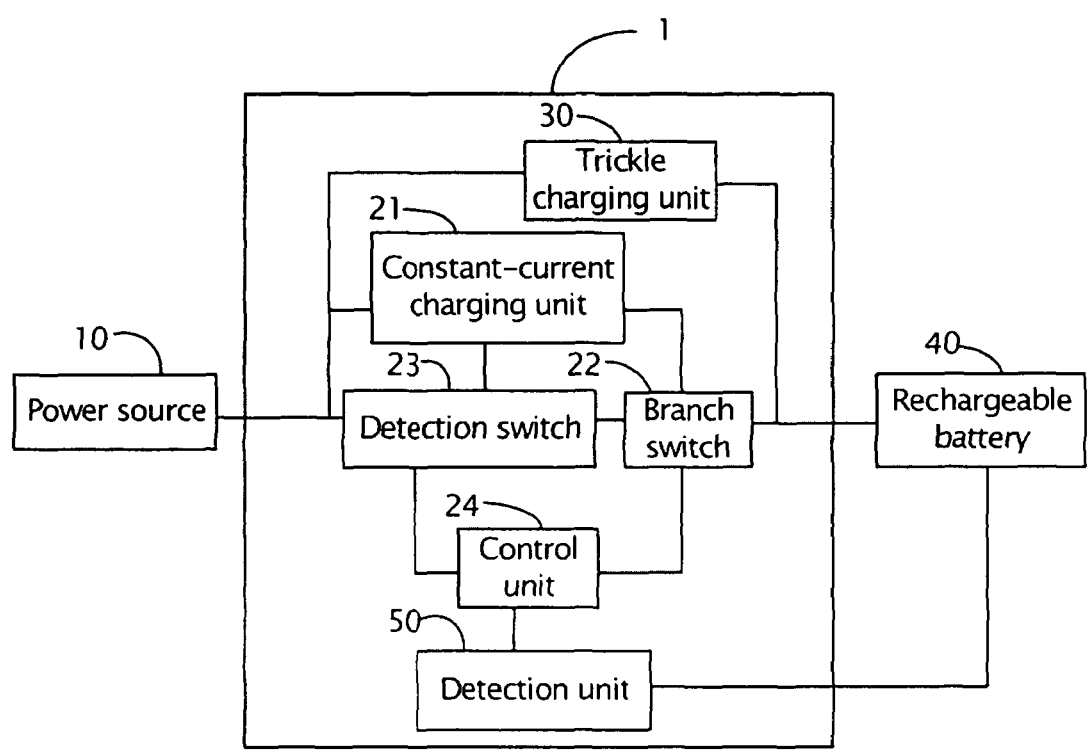
FIG. 1 is a block diagram of a battery charging control circuit in accordance with an exemplary embodiment.

Referring to FIG. 1, a battery charging control circuit 1 in accordance with an exemplary embodiment, includes a first branch and a second branch which are connected in parallel between a power source 10 and a rechargeable battery 40. The first branch includes a constant-current charging unit 21 and a branch switch 22, which are connected in series. The second branch includes a trickle charging unit 30. The battery charging control circuit 1 also includes a detection switch 23 which is connected between the power source 10 and the branch switch 22, and a control unit 24 which is connected to the detection switch 23 and the branch switch 22. The battery charging control circuit 1 further includes a detection unit 50 which connected to the control unit 24. The battery charging control circuit 1 firstly charges the rechargeable battery 40 under control of the constant-current charging unit 21 in a constant-current (CC) mode and then under control of the trickle charging unit 30 in a trickle mode. In the CC mode, the battery charging control circuit 1 charges the rechargeable battery 40 with a relatively large current, in the trickle mode, the battery charging control circuit 1 charges the rechargeable battery 40 with a relatively small current.

The constant-current charging unit 21 is configured for charging the rechargeable battery 40 with a relatively large current in the CC mode. The detection switch 23 is configured for being turned on and off alternately according to a voltage of the constant-current charging unit 21. The control unit 24 is configured for controlling the branch switch 22 to turn off and on alternately depending on the alternately on and off states of the detection switch 23. When the branch switch 22 is turned off, the constant-current charging unit 21 is disabled and the voltage of the constant-current charging unit 21 drops to zero. As a result, the detection switch 23 is turned off corresponding to the "zero" voltage of the constant-current charging unit 21. When the detection switch 23 turns off, the control unit 24 controls the branch switch 22 to turn on again and the constant-current charging unit 21 is enabled. In such a way, the branch switch 22 is turned on and off periodically and the charge current flows and stops alternately through the first branch. The battery charging control circuit 1 charges the rechargeable battery 40 in a pulse charging phase of the CC mode.

The trickle charging unit 30 is configured for charging the rechargeable battery 40 with a relatively small current in the trickle mode. The detection unit 50 is configured for detecting states of the rechargeable battery 40 and producing detection signals according to states of the battery 40. The states are determined by a plurality of parameters of the rechargeable battery 40, the parameters include but are not limited to, temperature of the rechargeable battery 40 and a sufficiency of charged state of the rechargeable battery 40. The control unit 24 is also configured for controlling the branch switch 22 to turn off upon receiving the detection signals from the detection unit 50. The control unit 24 is disabled to control the branch switch 22 according to states of the detection switch once the control unit 24 receives the detection signals from the detection unit 50, then, the first branch is opened and the second branch is employed to charge the rechargeable battery 40. Accordingly, the CC mode is terminated and the trickle mode is started.

Figure 2:
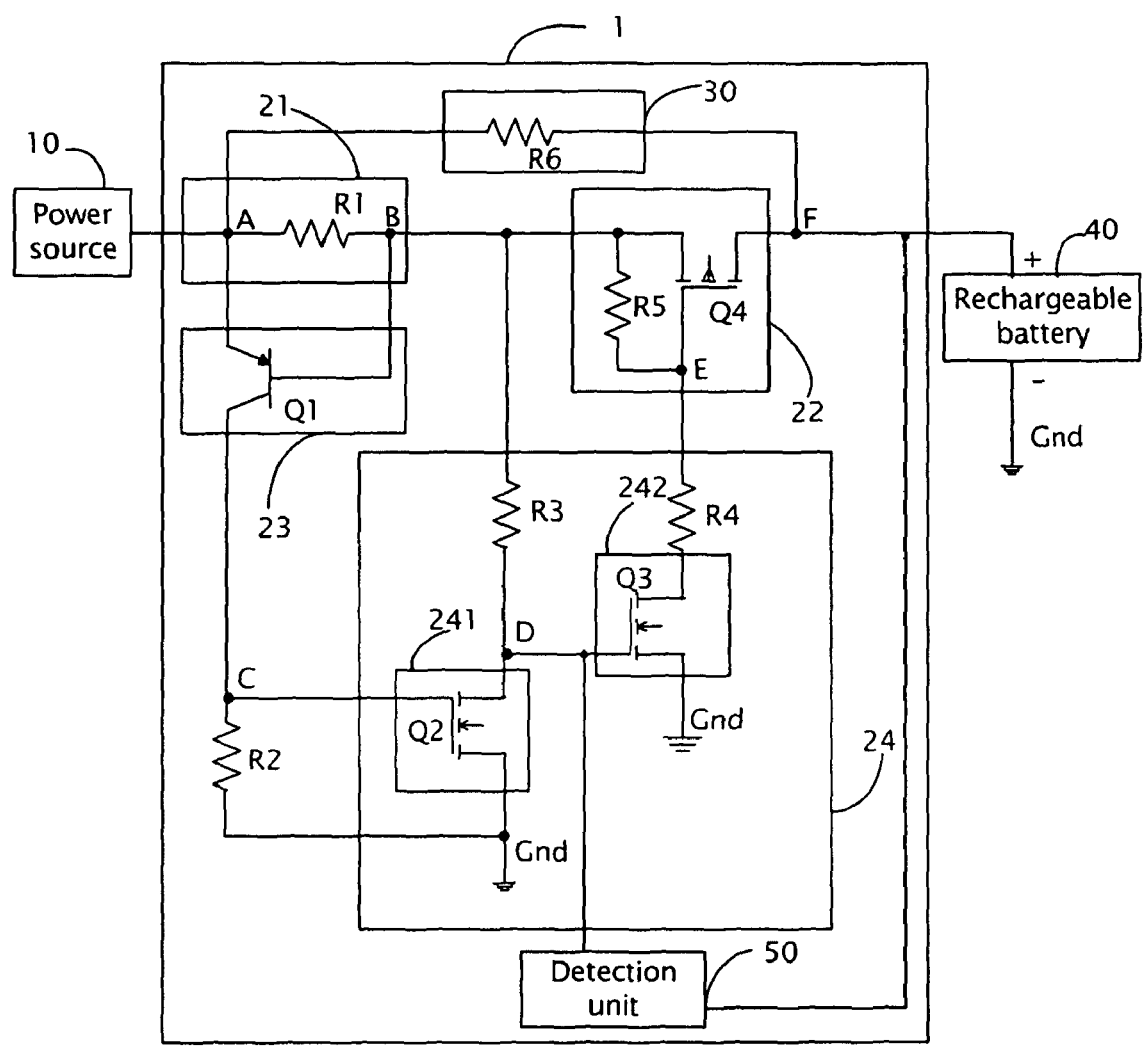
FIG. 2 is a circuit diagram of FIG. 1.

Referring to FIG. 2, in the exemplary embodiment, the constant-current charging unit 21 includes a resistor R1 with a terminal (shown as node A in FIG. 2) connected to the power source 10 and another terminal (shown as node B in FIG. 2) connected to the branch switch 22. The detection switch 23 can be a p-channel metal-oxide-semiconductor field-effect transistor (PMOSFET) or a positive-negative-positive (PNP) bipolar junction transistor (BJT). In the exemplary embodiment, a PNP BJT Q1 is taken as an example to illustrate the detection switch 23. An emitter of the PNP BJT Q1 is connected to the node A and a base of the PNP BJT Q1 is connected to the node B.

The branch switch 22 includes a low voltage activated switch Q4 and a resistor R5. The low voltage activated switch Q4 can be a PMOSFET or a PNP BJT. In the exemplary embodiment, a PMOSFET Q4 is taken as an example to illustrate the low voltage activated switch Q4. The resistor R5 is connected between a source and a gate (shown as node E in the FIG. 2) of the PMOSFET Q4. A drain (shown as node F in the FIG. 2) of the PMOSFET Q4 is connected to an anode of the rechargeable battery 40.

The control unit 24 includes a first switch 241 and a second switch 242. Each of the first switch 241 and the second switch 242 can be an n-channel metal-oxide-semiconductor field-effect transistor (NMOSFET) or a negative-positive-negative (NPN) bipolar junction transistor (BJT). In the exemplary embodiment, NMOSFETs Q2 and Q3 are respectively taken as examples to illustrate the first switch 241 and the second switch 242. A gate (shown as node C in the FIG. 2) of the NMOSFET Q2 is connected to a collector of the NPN BJT Q1. Node C is also connected to ground through a resistor R2. A drain of the NMOSFET Q2 is grounded. A source (shown as node D in the FIG. 2) of the NMOSFET Q2 is connected to a gate of the NMOSFET Q3. Node D is also connected to node B through a resistor R3. A source of the NMOSFET Q3 is grounded and a drain of the NMOSFET Q3 is connected to node E of the NMOSFET Q4 through a resistor R4.

The trickle charging unit 30 includes a resistor R6. The resistance value of the resistor R6 is much larger than a resistance value of the resistor R1.

Because the resistor R6 has a much larger resistance value than the resistor R1 does, when the battery charging control circuit 1 receives the power source 10 and starts charging the rechargeable battery 40, the resistor R6 is bypassed by the resistor R1, namely the battery charging control circuit 1 initially charges the rechargeable battery 40 in the CC mode. The current through the resistor R1 increases gradually and so does the voltage of the resistor R1 in proportion to the current increases too. When the voltage of the resistor R1 is larger than a threshold voltage of the NPN BJT Q1, the NPN BJT Q1 is turned on. The gate of the NMOSFET Q2 obtains a high voltage through the NPN BJT Q1 and the NMOSFET Q2 is accordingly turned on. The gate of the NMOSFET Q3 is then grounded by the NMOSFET Q2 and the NMOSFET Q3 is accordingly turned off. A current path defined by the resistors R1, R4, R5 and the NMOSFET Q3 is cut off and a voltage drop of the resistor R5 is removed. There is no voltage drop applied between the source and gate of the PMOSFET Q4. Thus, the PMOSFET Q4 is turned off.

When the PMOSFET Q4 is turned off, the current flowing through the resistor R1 drops and the detection voltage drops too. When the voltage of the resistor R1 falls below the threshold voltage of the NPN BJT Q1, the NPN BJT Q1 is turned off. The gate of the NMOSFET Q2 is grounded by the resistor R2 and the NMOSFET Q2 is accordingly turned off. The gate of the NMOSFET Q3 is connected to node B through the resistor R3 and the NMOSFET Q3 is accordingly turned on. The current path defined by the resistors R1, R4, R5 and the NMOSFET Q3 is re-established. A voltage drop across the resistor R5 turns on the PMOSFET Q4, and current flows through the first branch again to charge the rechargeable battery 40.

As described above, in the CC mode, the PMOSFET Q4 cycles on and off, and the battery charging control circuit 1 charges or pauses charging the rechargeable battery 40 periodically. In other words, the battery charging control circuit 1 charges the recharge battery 40 in the pulse charging phase of the CC mode.

In the exemplary embodiment, the detection unit 50 is a full charge detection unit. An output port (not shown) of the full charging detection unit is connected to the gate of the NMOSFET Q3.

If the full charge detection unit detects that the rechargeable battery 40 is nearly fully charged, the full charge detection unit transmits a low voltage signal to the gate of the NMOSFET Q3 and accordingly turns off the NMOSFET Q3. The current path defined by the resistors R1, R4, R5 and the NMOSFET Q3 is cut off and the voltage to the resistor R5 is removed. There is no voltage drop across the source and gate of the PMOSFET Q4. Thus, the PMOSFET Q4 is turned off and the CC mode is terminated, the battery charging control circuit 1 charges the rechargeable battery 40 through the trickle charging unit 30, namely, the battery charging control circuit 1 charges the rechargeable battery 40 in the trickle mode. Because the resistance value of the resistor R6 of the trickle charging unit 30 is relatively large, the current flowing through the resistor R6 is small, and the battery charging control circuit 1 charges the rechargeable battery 40 with a small current in the trickle mode.

It is believed that the present embodiments and their advantages will be understood from the foregoing description, and it will be apparent that various changes may be made thereto without departing from the spirit and scope of the disclosure or sacrificing all of its material advantages, the examples hereinbefore described merely being preferred or exemplary embodiments of the present disclosure.

What is claimed is:

1. A battery charging control circuit, comprising:
a constant-current charging unit configured for charging the rechargeable battery in a constant-current mode, wherein, the constant-current charging unit comprises a resistor which is connected between a power source and a branch switch;
a detection switch configured for turning on or off depending on the enable or disable state of the constant-current charging unit, wherein, the detection switch is a low voltage activated switch comprising a control terminal, a first path terminal, and a second path terminal, the first path terminal of the detection switch is connected to the power source, the second path terminal of the detection switch is grounded, and the control terminal of the detection switch is connected to a connection node of the constant-current charging unit and the branch switch;
the branch switch connected between the constant-current charging unit and the rechargeable battery, and configured for enabling or disabling the constant-current charging unit, wherein, the branch switch comprises a first switch and a first resistor, a control terminal of the first switch is connected to the control unit, a first path terminal of the first switch is connected to the control terminal of the detection switch, a second path terminal of the first switch is connected to the anode of the rechargeable battery; the first resistor is connected between the control terminal and the first path terminal of the first switch; and
a control unit connected with the detection switch and the branch switch, and configured for controlling the branch switch to turn off when the detection switch is turned on, and controlling the branch switch to turn on when the detection switch is turned off.

2. The battery charging circuit of claim 1, wherein the detection switch is a positive-negative-positive (pnp) bipolar junction transistor (BJT), and the control terminal, the first path terminal, and the second path terminal of the detection switch correspond to a base, an emitter, and a collector, respectively, of the pnp BJT.

3. The battery charging circuit of claim 1, wherein the detection switch is a p-channel metal-oxide-semiconductor field-effect transistor (PMOSFET), and the control terminal, the first path terminal, and the second path terminal of the detection switch correspond to a gate, a source, and a drain, respectively, of the PMOSFET.

4. The battery charging control circuit of claim 1, wherein the first switch is a PNP BJT, the control terminal, and the first path terminal, and the second path terminal of the first switch correspond to a base, an emitter, and a collector, respectively, of the PNP BJT.

5. The battery charging circuit of claim 1, wherein the first switch is a PMOSFET, and the control terminal, the first path terminal, and the second path terminal of the detection switch correspond to a gate, a source, and a drain, respectively, of the PMOSFET.

6. The battery charging circuit of claim 1, wherein the control unit comprises a second switch and a third switch, the second switch and the third switch each comprise a control terminal, a first path terminal, and a second path terminal, a control terminal of the second switch is connected to the second path terminal of the detection switch, a first path terminal of the second switch is connected to the control terminal of the detection switch through a second resistor, a second path terminal of the second switch is grounded; a control terminal of the third switch is connected to the first path terminal of the second switch, a first path terminal of the third switch is grounded, and a second path terminal of the third switch is connected to the control terminal of the first switch through a third resistor.

7. The battery charging control circuit of claim 6, wherein the second switch and the third switch are negative-positive-negative (npn) bipolar junction transistors (BJTs), and the control terminals, the first path terminals, and the second path terminals of the second switch and the third switch correspond to bases, emitters, and collectors, respectively, of the npn BJTs.

8. The battery charging circuit of claim 6, wherein the second switch and the third switch are n-channel metal-oxide-semiconductor field-effect transistors (NMOSFETs), and the control terminals, the first path terminals, and the second path terminals of the second switch and the third switch correspond to gates, sources, and drains, respectively, of the NMOSFETs.

* * * * *